Feb. 1, 1949.   C. B. WALLMAN   2,460,477
INDEXING HEAD

Filed Nov. 15, 1946   3 Sheets-Sheet 1

INVENTOR.
Carl B. Wallman
BY
Carlson, Pitzner, Hubbard & Wolfe
ATTORNEYS

Feb. 1, 1949. C. B. WALLMAN 2,460,477
INDEXING HEAD
Filed Nov. 15, 1946 3 Sheets-Sheet 2
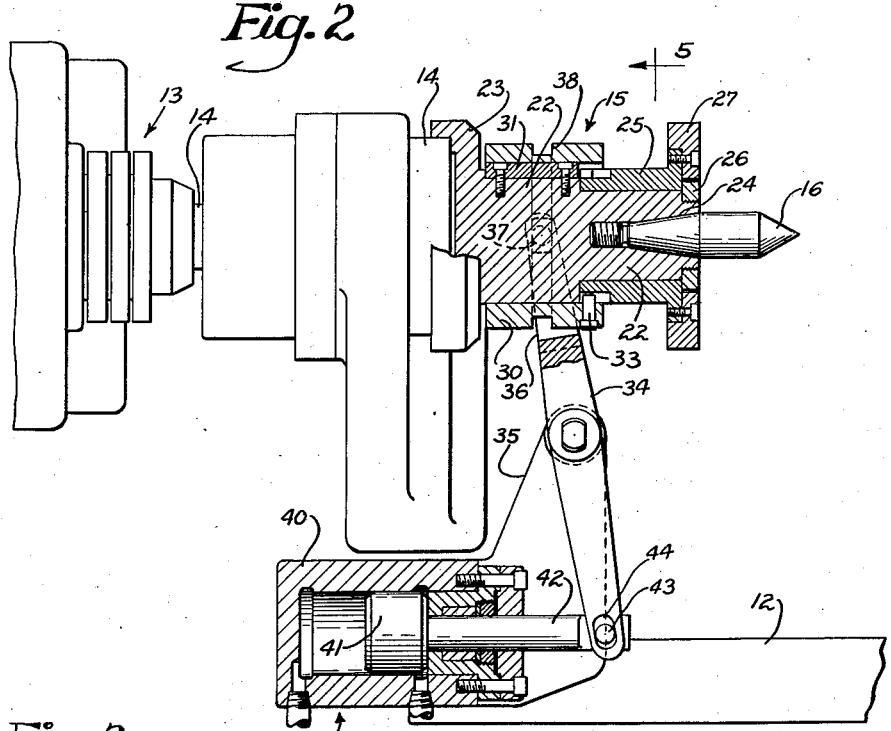
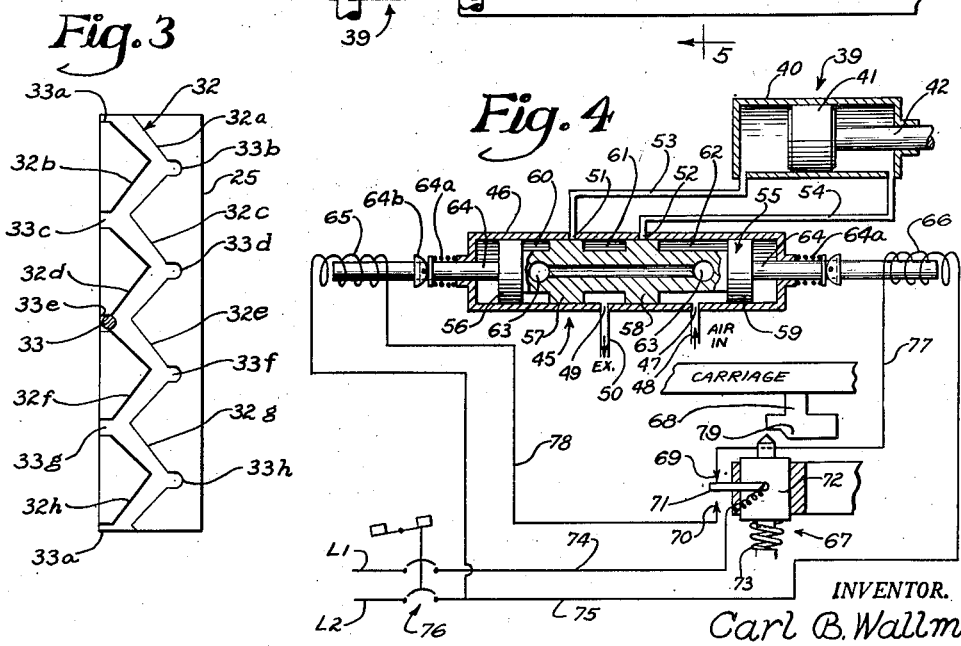
INVENTOR.
Carl B. Wallman
BY
Carlson, Pitzner, Hubbard & Wolfe
ATTORNEYS Feb. 1, 1949.  C. B. WALLMAN  2,460,477
INDEXING HEAD
Filed Nov. 15, 1946  3 Sheets-Sheet 3

INVENTOR.
Carl B. Wallman
BY
Carlson, Pitzner, Hubbard & Wolfe
ATTORNEYS

Patented Feb. 1, 1949

2,460,477

UNITED STATES PATENT OFFICE 2,460,477

INDEXING HEAD

Carl B. Wallman, Birmingham, Mich., assignor to Ex-Cell-O Corporation, Detroit, Mich., a corporation of Michigan Application November 15, 1946, Serial No. 710,005

9 Claims. (Cl. 51—216)

The present invention relates to improvements in rotary indexing heads.

One of the objects of the present invention is to provide a rotary indexing head which is adapted for automatic actuation in each cycle through a selective number of steps to obtain an indexing movement of any desired magnitude.

Another object is to provide a rotary indexing head comprising a pair of actuating elements, one of which is connected for rotation with the drive spindle, the other of which is adapted for connection with the part to be indexed, and the two of which are interconnected through a follower pin and peripheral zigzag cam arrangement whereby relative reciprocation between said elements in opposite directions will effect a succession of step-by-step indexing movements.

A further object is to provide a rotary indexing head of the foregoing character which is simple and inexpensive in construction, and which is adapted for operation either manually or automatically in timed relation to the traverse movements between the tool and the work.

Other objects and advantages will become apparent as the description proceeds.

In the accompanying drawings:

Fig. 2 is a fragmentary plan view partially in axial section of the indexing head and operating means therefor.

Fig. 3 is an enlarged development of the periphery of a cam element forming part of the rotary indexing head.

Fig. 4 is a diagrammatic representation of a pneumatic and electric operating system for the indexing head.

Figure 1:
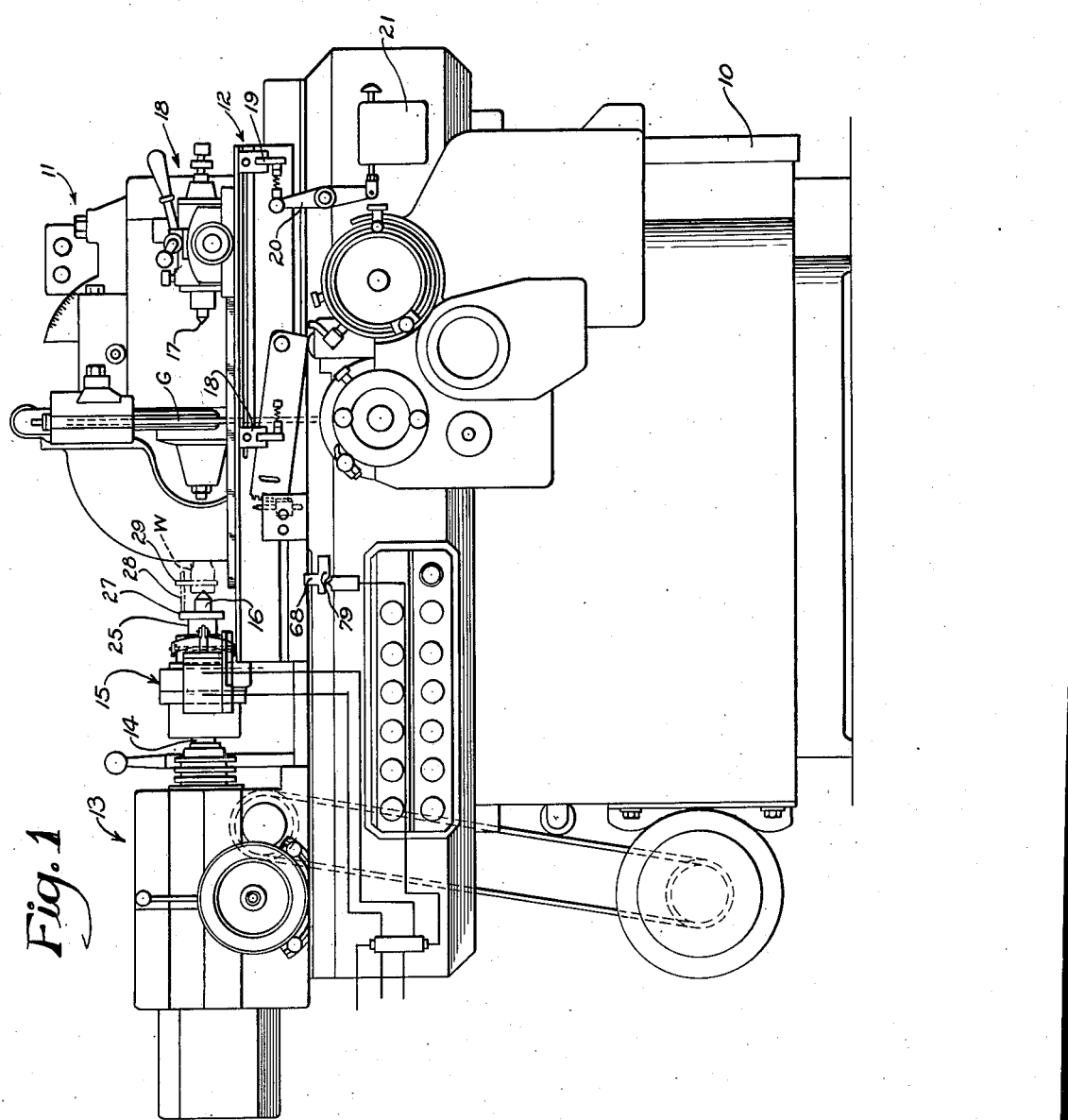
Figure 1 is a front elevational view of a grinding machine in which is incorporated a rotary indexing head embodying the features of the present invention.
Figure 5:
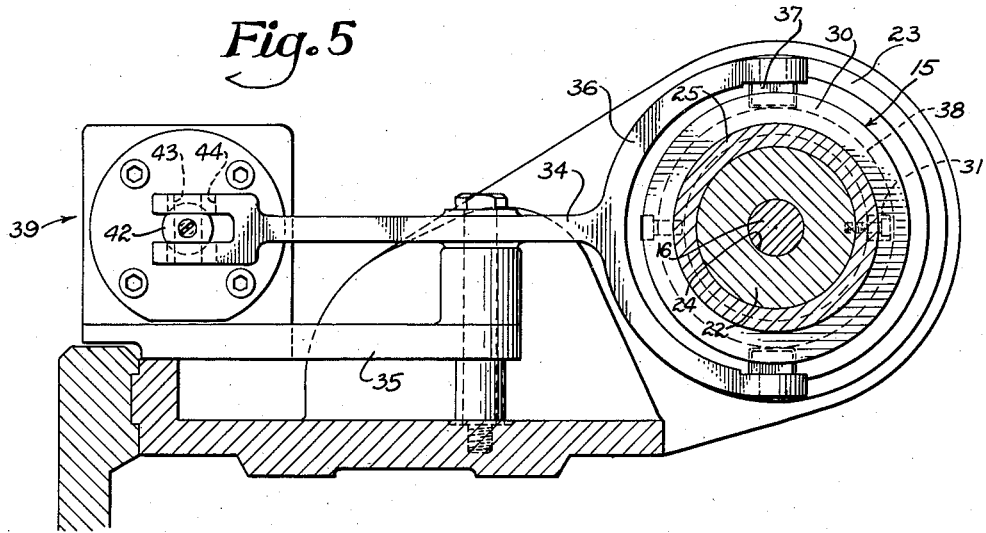
Fig. 5 is a transverse vertical sectional view of the indexing head taken substantially along line 5—5 of Fig. 2.

Referring more particularly to the drawings, the automatic indexing head, constituting the exemplary embodiment of the invention, may be employed in or with various types of machine tools for material removing operations to index angularly a rotary part step-by-step in timed relation to a succession of relative traverse movements between said part and another part in cutting association therewith. In a more specific aspect, the rotary part would commonly be a work-piece relatively movable axially in a succession of strokes through cutting engagement with a tool constituting the other part. While the indexing head may be utilized for various kinds of workpieces and types of material removing operations, it is especially suited for, and hence illustrated as incorporated in, a thread grinding machine of the character disclosed in U. S. Letters Patent No. 2,317,226, and serves to adapt the machine for the grinding of multiple threads.

The construction of the machine in large measure forms no part of the present invention, and hence is not disclosed in detail, but reference may be had to the aforesaid patent for a more complete understanding thereof.

It is sufficient to state for the purpose of the present invention that the machine comprises a base 10, a tool head 11 slidably mounted on the rear portion of the base for approach and feed movements forwardly and a return movement rearwardly, and a work-supporting carriage 12 slidably mounted on the front portion of the base for reciprocation across the front of the tool head. A thread grinding wheel G is mounted on the tool head 11 for rotary power drive and for adjustment to compensate for the lead of the work thread. Mounted on one end of the carriage 12 for translation therewith is a headstock 13 having a drive spindle 14 rotatable on an axis parallel to the direction of translation.

The workpiece, which may comprise a multiple thread lead screw or worm W, may be operatively supported in any suitable manner in coaxial relation with the spindle 14 for rotation and translation therewith in different indexed positions. In the present instance, one end of the workpiece W is supported from the spindle 14 through the intermediary of the indexing head, indicated generally at 15, on a live center 16, and the other end is supported on an aligned dead center 17 forming part of a conventional tailstock 18 adjustably mounted on the carriage 12.

Any suitable power operated means (not fully shown) such as that disclosed in the aforesaid patent, may be provided for driving the carriage 12 and spindle 14 reversibly in predetermined timed relation. Preferably, the drive means is automatically controlled to repeat the machine cycle for the number of strokes required to complete the grinding of each workpiece. In the present instance, the control means comprises two dogs 18 and 19 adjustably mounted in spaced relation on the carriage 12, and arranged for engagement alternately with the upper end of a vertical lever 20 pivoted intermediate its ends on the front of the base 10. The lower end of the lever 20 is connected to a limit switch 21 controlling the direction of operation of the drive means. It will be evident that the location and spacing of the dogs 18 and 19 determines the range and extent of carriage travel, and that at the end of each stroke one or the other of the dogs will effect actuation of the switch 21 to reverse the drive means. Thus, under the control of the dogs 18 and 19, the carriage 12 will continue to reciprocate, forwardly from left to right and reversedly from right to left, until discontinued manually or automatically through the medium of a stroke counter (not shown). It will be understood that upon each reversal of the carriage travel, the direction of rotation of the spindle 14 is also reversed.

The indexing head 15 affords an adjustable rotary drive connection between the spindle 14 and the workpiece W, and in its preferred form comprises a generally cylindrical body 22 rigidly secured in coaxial relation to the nose of the spindle. More particularly, the base end of the body 22 is formed with a mounting flange 23 interfitting concentrically with and bolted to the spindle 14. The free outer end of the body 22 is formed with a tapered axial socket 24 in which the live center 16 is secured.

Rotatably confined on the outer end of the body 22 is a coupling element 25 which serves also as the drive element for the workpiece W. Preferably, the element 25 consists of a sleeve rotatable on a reduced outer end portion of the body 22, and confined in position by an overlapping ring nut 26. The element 25 may be constructed in any suitable form to provide a drive connection with the workpiece W. Thus, the element 25 could be provided in the form of a chuck in which event the center 16 and possibly also the center 17 could be dispensed with as a work supporting means. In the present instance, the element 25 has an outer end peripheral flange 27 with pins 28 engaging a drive dog 29 clamped to the work. Also mounted on the body 22 in this instance for relative axial adjustment but for rotation therewith is a second coupling element 30 in rotary driving engagement with the element 25. More particularly, the element 30 comprises a cylindrical sleeve slidable on the base end portion of the body 22, and connected thereto by a longitudinal spline key 31.

The coupling elements 25 and 30 are interconnected for relative angular indexing adjustment upon relative axial reciprocation. Thus, one of the elements is formed with a circumferential cam track 32, and the other element is provided with a follower pin 33 engaging in the track. In the preferred construction, the track 32 consists of a zigzag groove formed in the outer peripheral surface of the element 25, which in effect constitutes a cam ring and the pin 33 projects radially inwardly from the element 30 for coaction with opposite sides of the groove.

The zigzag track or groove 32 (Fig. 3) defines a peripherally staggered series of cam surfaces or faces which are uniform in length and alternately inclined in opposite directions. Any suitable number of such cam faces may be provided depending on the number of index movements desired per revolution. In the present instance, eight cam faces 32a to 32h are shown, and each is effective through coaction with the pin 33 to rotate the element 25 through 45°. Also formed in the groove 32 respectively opposite the trailing ends of the cam faces are a series of locating recesses 33a to 33h to receive the pin 33 at the end of each indexing movement and thereby provide a positive rotary drive connection between the elements 25 and 30 when the latter is held in one extreme end position or the other.

In operation, each reciprocation of the sleeve element 30 will effect rotary indexing of the element 25 relative to the spindle 14 and body 22 through 45°. Thus, with the pin 33 located in the recess 33e, shifting of the element 30 to the right will move the pin initially out of the recess into engagement with the lead end of the cam face 32e, and then along the latter into the recess 33f as the element 25 is indexed by the camming action through 45° in a clockwise direction as viewed from the right of Fig. 2. If the sleeve element 30 is now shifted to the left, the pin 33 will move from the recess 33f through camming engagement with the face 32f into the next recess 33g to index the element 25 through another 45°. Hence, the total or aggregate indexing movement of the element 25 in each operation may be varied as desired by reciprocating the element 30 back and forth an appropriate number of times, for example, once for eight index positions 45° apart, twice for four index positions 90° apart, and, four times for two index positions 180° apart. It will further be evident, that the number of indexing stations per revolution may be varied to suit the requirements of different workpieces by substituting cam elements 25 with grooves 32 comprising different odd or even numbers of cam faces.

Within the broad aspects of the invention, the sleeve 30 may be reciprocated by any suitable means either manually or automatically in response to the movements of the carriage 12. In the present instance, the actuating means comprises a lever 34 pivoted intermediate its ends on a bracket 35 bolted to the carriage 12. One end of the lever 34 is provided with a yoke 36 having pins 37 engaging in a circumferential groove 38 formed in the outer periphery of the sleeve member 30. The other end is connected for oscillation to a suitable reversible actuator 39. In the present instance, the actuator 39 is of the reciprocable type operable by fluid pressure, such as compressed air, and specifically comprises a cylinder 40 mounted on the bracket 35 and a piston 41 reciprocable therein. The piston 41 has an axial rod 42 projecting from the cylinder 40, and connected by a pin 43 and slot 44 to the lever 34.

The actuator 39 is adapted to be supplied with pressure fluid from a suitable source under the control of a reversing valve 45 preferably of the solenoid-operated type. In the form shown, the valve 45 comprises a cylindrical casing 46 having a pressure port 47 connected to an air supply line 48, an exhaust port 49 connected to an exhaust line 50, and two ports 51 and 52 connected respectively through lines 53 and 54 to opposite ends of the cylinder 40. Reciprocable in the casing 46 is a valve spool 55 having a series of axially spaced collars 56 to 59 separated by peripheral grooves 60 to 62, the grooves 60 and 62 being interconnected by a passage 63. The arrangement is such that in the central position of the valve spool 55, the ports 51 and 52 are blocked; in the left end position, pressure air is supplied to the cylinder line 54 while the line 53 is connected to exhaust; and in the right end position, the pressure and exhaust connections to the lines 53 and 54 are reversed. The spool 55 has axial valve stems 64 which extend outwardly from opposite ends of the casing 46 and which constitute the cores of two solenoids 65 and 66. Coil springs 64a interposed between the ends of the casing 46 and collars 64b on the stems 64 normally tend to center the spool 55 when both solenoids are deenergized. It will be evident that excitation of the solenoid 65 will shift the spool 55 to the left into one end position, while excitation of the solenoid 66 will shift the spool to the right into the other end position.

Excitation of the solenoids 65 and 66 may be selectively controlled in any suitable manner from the movements of the carriage 12 and in accordance with the requirements of the workpiece to provide the desired number of indexed positions and cutting strokes in each position. In the present instance, a double-throw overtravel limit switch 67 operable by a dog 68 on the carriage 12 is connected in a suitable electrical control circuit with the solenoids 65 and 66. The switch 67 comprises opposed stationary contacts 69 and 70, and an intermediate movable contact 71 operable by a plunger 72. Normally, the plunger 72 is urged upwardly by a spring 73 into the path of the dog 69 and into one position to engage the contacts 69 and 71 whereby to effect excitation of the solenoid 66. The plunger 72 is shiftable by the dog 69 into the other position to engage the contacts 70 and 71 whereby to effect excitation of the solenoid 65. The electrical circuit comprises two lines 74 and 75 adapted for connection through a master switch 76 to electrical supply mains L1 and L2. One line 74 is connected to the movable contact 71. The other line 75 is connected in parallel to the outer ends of the solenoids 65 and 66, and the contacts 69 and 70 are connected respectively through lines 77 and 78 to the inner ends of the solenoids.

The carriage dog 68 may be formed with cam projections of any desired form and number for actuating the switch plunger 72. In the present instance, the dog 68 is provided with a single cam projection 79, and is so located in relation to the carriage reversing dog 19 that in each carriage stroke to the left, after separation of the wheel G from the workpiece W but before carriage reversal, the plunger 72 will be depressed to effect one indexing movement of 45°, and after reversal but before reengagement of the work with the wheel will be released to effect a second indexing movement of 45°, thus effecting a total station to station indexing movement of 90°. It will be evident that the foregoing arrangement is specifically adapted for the grinding of a worm with quadruple threads, i. e., for thread grooves starting 90° apart and having a pitch or lead four times the axial distance from any one thread convolution to the next, with a double grinding pass through each groove.

Figure 6:
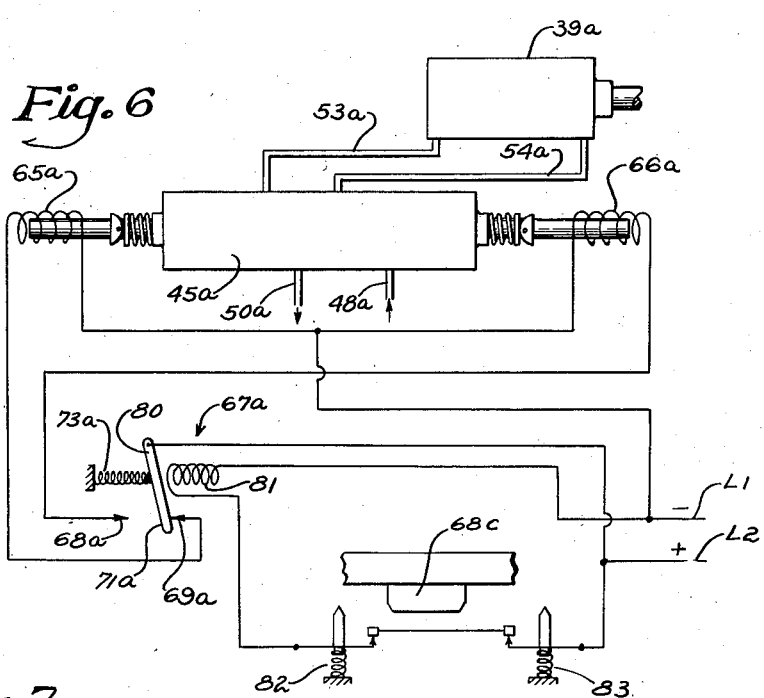
Fig. 6 is a modified form of pneumatic and electric operating system for the indexing head.

The number of increments effected to produce each complete indexing movement is influenced by the character of the switch control means and also by the nature of the abutment means on the dog 68. As previously described, the specific switch 72 and abutment 79 will effect two increments totaling 90° at one end of each grinding pass and none at the other end. By providing a V-shaped abutment 79a, as shown in Fig. 6, arranged to overtravel the plunger 72 in both directions of carriage traverse, four steps or increments totaling 180° would be produced in each complete indexing movement. Such an arrangement would be specifically adapted for the grinding of a worm with two parallel threads. By substituting, for the double throw switch 67, a switch (not shown) requiring a complete cycle of down and up movements to alter its contacts, it would be possible to confine the indexing movements to one step of 45°.

It will be evident from the foregoing that indexing movements of any desired magnitude are obtainable by selectively varying the number of cam faces in the element 25, the number and form of serrations or projections on the carriage dog 68 and the character of the control switch for the valve 45.

Figure 7:
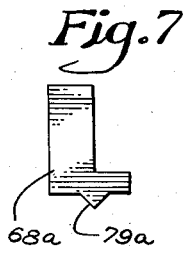
Fig. 7 is a view of a modified form of switch actuating dog adapted for use in the operating system of Fig. 4.

The controls thus far described provide only for actuation of the valve 45 at one end of the carriage traverse. Actuation of the valve 45 to produce an indexing movement at the end of each grinding pass or stroke in each direction of carriage traverse may be effected through suitable modification of the electrical control circuit. Thus, as illustrated in Fig. 7, the actuating solenoids 65a and 66a for the valve 45a may be controlled by a double throw relay switch 67a having fixed contacts 69a and 70a, and an intermediate movable contact 71a on an armature 80 biased in one direction by a spring 73a and movable in the opposite direction by an actuating coil 81. Normally closed limit switches 82 and 83 connected in series to control excitation of the coil 81 may be mounted for actuation by a dog 68c respectively at opposite ends of the carriage traverse.

I claim as my invention:

1. A rotary indexing head comprising, in combination with a spindle supported for rotary drive and adapted to support an indexible part for rotation therewith, a first coupling element coaxially secured to said spindle for rotation relative thereto, and adapted for positive rotary drive connection with said part, a second coupling element splined to said spindle for rotation therewith and for axial sliding movement relative thereto, one of said elements being formed with a circumferential series of cam faces of uniform length, each inclined relative to the periphery and the axis of rotation and with a locating socket at the trailing end of each face, alternate faces being oppositely inclined and facing in opposite directions, follower means on the other of said elements arranged to coact with said faces and to seat selectively in said sockets to establish a positive rotary drive connection between said elements, and means for selectively effecting relative reciprocation between said elements, whereby upon each such reciprocation in either direction said one element is rotatably indexed relative to said spindle from any one socket to the next contiguous socket through a distance corresponding to the peripheral component of a cam face.

2. A rotary indexing head comprising, in combination with a spindle supported for rotary drive and adapted to support an indexible part for rotation therewith, a first coupling element coaxially secured to said spindle for rotation relative thereto, and adapted for positive rotary drive connection with said part, a second coupling element splined to said spindle for rotation therewith and for axial sliding movement relative thereto, one of said elements being formed with a circumferential series of cam faces of uniform length, each inclined relative to the periphery and the axis of rotation, alternate faces being oppositely inclined and facing in opposite direction, follower means on the other of said elements arranged to coact with said faces, and means for selectively effecting relative reciprocation between said elements, whereby upon each such reciprocation in either direction said one element is rotatably indexed relative to said spindle from any one station to the next contiguous station through a distance corresponding to the peripheral component of a cam face.

3. A rotary indexing head comprising, in combination with a spindle supported for rotary drive and adapted to support a workpiece for rotation therewith, a first coupling element coaxially secured to said spindle for rotation relative thereto, and adapted for positive rotary drive connection with said workpiece, a second coupling element splined to said spindle for rotation therewith and for axial sliding movement relative thereto, said first element being formed with a circumferential series of cam faces of uniform length, each inclined relative to the periphery and the axis of rotation and with a locating socket at the trailing end of each face, alternate faces being oppositely inclined and facing in opposite directions, follower means on said second element arranged to coact with said faces and to seat selectively in said sockets to establish a positive rotary drive connection between said elements, and means for selectively effecting relative reciprocation between said elements, whereby upon each such reciprocation in either direction said first element is rotatably indexed relative to said spindle from any one socket to the next contiguous socket through a distance corresponding to the peripheral component of a cam face.

4. A rotary indexing head comprising, in combination with a spindle supported for rotary drive and adapted to support a workpiece for rotation therewith, a first sleeve element coaxially secured to said spindle for rotation relative thereto, and adapted for positive rotary drive connection with said workpiece, a second sleeve element splined to said spindle for rotation therewith and for axial sliding movement relative thereto and into telescoping relation with said first element, said first element being formed in the outer periphery with a circumferential zigzag groove defining a series of cam faces of uniform length alternately inclined in opposite directions, follower means on said second element arranged to coact successively with said faces, and means for selectively effecting relative reciprocation between said elements, whereby upon each such reciprocation in either direction said first element is rotatably indexed relative to said spindle from any one station to the next contiguous station through a distance corresponding to the peripheral component of a cam face.

5. A rotary indexing head comprising, in combination with a spindle supported for rotary drive and adapted to support a workpiece for rotation therewith, a first coupling element coaxially secured to said spindle for rotation relative thereto, and adapted for positive rotary drive connection with said workpiece, a second coupling element splined to said spindle for rotation therewith and for axial sliding movement relative thereto, one of said elements being formed with a zigzag groove defining circumferential series of cam faces of uniform length, each inclined relative to the periphery and the axis of rotation alternate faces being oppositely inclined and facing in opposite directions, follower means on the other of said elements arranged to coact with said faces and to seat selectively in said sockets to establish a positive rotary drive connection between said elements, a lever having a yoke engaging said second element, and a reciprocatory fluid pressure actuator connected to said lever for effecting reciprocation of said second element whereby upon each such reciprocation of said second element in either direction said one element is rotatably indexed relative to said spindle from any one socket to the next contiguous socket through a distance corresponding to the peripheral component of a cam face.

6. A rotary indexing head comprising in combination with a reciprocatory carriage and a spindle mounted for rotation on said carriage and for translation therewith, two telescoping sleeve elements coaxially mounted on said spindle and interconnected for relative rotary adjustment step-by-step upon relative axial reciprocation therebetween in opposite directions, and for joint rotation in each position of rotary adjustment, one of said elements being rotatable on said spindle and the other of said elements being splined for axial sliding movement on said spindle, and means operable in response to each movement of said carriage into a predetermined position to effect a relative reciprocation between said elements.

7. A rotary indexing head comprising in combination with a reciprocatory carriage and a spindle mounted for rotation on said carriage and for translation therewith, two telescoping sleeve elements coaxially mounted on said spindle and interconnected for relative rotary adjustment step-by-step upon relative axial reciprocation therebetween in opposite directions, and for joint rotation in each position of rotary adjustment, one of said elements being rotatable on said spindle and the other of said elements being splined for axial sliding movement on said spindle, main control means including a reversible pressure fluid actuator operatively connected to said other element for reciprocating the latter and a reversing valve for directing pressure fluid alternately to opposite sides of said actuator, and pilot control means operable in response to each movement of said carriage into a predetermined position to effect reversal of said valve.

8. A rotary indexing head comprising in combination with a reciprocatory carriage and a spindle mounted for rotation on said carriage and for translation therewith, two telescoping sleeve elements coaxially mounted on said spindle and interconnected for relative rotary adjustment step-by-step upon relative axial reciprocation therebetween in opposite directions, and for joint rotation in each position of rotary adjustment, one of said elements being rotatable on said spindle and the other of said elements being splined for axial sliding movement on said spindle, main control means including a reversible pressure fluid actuator operatively connected to said other element for reciprocating the latter and a solenoid operated reversing valve for directing pressure fluid alternately to opposite sides of said actuator, an electric pilot control circuit for said valve including an electric double-throw limit switch normally biased to locate said valve in one end position, and means including a dog movable with said carriage and operable upon each movement of said carriage into a predetermined position to actuate said switch out of normal position to locate said valve in the other end position.

9. A rotary indexing head comprising in combination with a reciprocatory carriage and a spindle mounted for rotation on said carriage and for translation therewith, two telescoping sleeve elements coaxially mounted on said spindle and interconnected for relative rotary adjustment step-by-step upon relative axial reciprocation therebetween in opposite directions, and for joint rotation in each position of rotary adjustment, one of said elements being rotatable on said spindle and the other of said elements being splined for axial sliding movement on said spindle, main control means including a reversible pressure fluid actuator operatively connected to said other element for reciprocating the latter and a solenoid operated reversing valve for directing pressure fluid alternately to opposite sides of said actuator, an electric pilot control circuit for said valve including an electric double-throw relay switch normally biased to locate said valve in one end position, switch means controlling said relay switch, and dog means movable with said carriage and engageable selectively with said switch means upon movement of said carriage into different predetermined positions to effect actuation of said relay switch to locate said valve in the other end position.

CARL B. WALLMAN.

REFERENCES CITED

The following references are of record in the file of this patent:

UNITED STATES PATENTS

| Number | Name | Date |
|---|---|---|
| 631,640 | Hubbuch | Aug. 22, 1899 |
| 1,981,263 | Croft | Nov. 20, 1934 |
| 2,348,992 | Moerlin | May 16, 1944 |

FOREIGN PATENTS

| Number | Country | Date |
|---|---|---|
| 687,619 | Germany | Feb. 2, 1940 |